(12) United States Patent
Vierra

(10) Patent No.: US 7,065,919 B1
(45) Date of Patent: Jun. 27, 2006

(54) INSECT CAPTIVATION

(76) Inventor: Samuel Vierra, 5348 N. Hammill Rd., El Monte, CA (US) 91732

( * ) Notice: Subject to any disclaimer, the term of this patent is extended or adjusted under 35 U.S.C. 154(b) by 0 days.

(21) Appl. No.: 11/052,508

(22) Filed: Feb. 7, 2005

(51) Int. Cl.
*A01M 3/02* (2006.01)
*A01M 3/04* (2006.01)

(52) U.S. Cl. .............................. 43/136; 43/137; 43/114

(58) Field of Classification Search ................. 43/107, 43/111, 114, 136, 137, 11, 110; A01M 3/02
See application file for complete search history.

(56) References Cited

U.S. PATENT DOCUMENTS

| | | | |
|---|---|---|---|
| 1,190,165 A * | 7/1916 | Hemenway .................. | 43/136 |
| 1,515,158 A * | 11/1924 | Miller .......................... | 43/135 |
| 1,515,296 A * | 11/1924 | Christiansen ................ | 43/134 |
| 1,888,563 A | 11/1932 | Nixon | |
| 2,191,126 A * | 2/1940 | Gustke ......................... | 43/135 |
| 2,434,364 A * | 1/1948 | Linding ........................ | 43/137 |
| 2,496,415 A * | 2/1950 | Sharpe ......................... | 43/137 |
| 2,545,215 A * | 3/1951 | Sharpe ......................... | 43/137 |
| 3,191,339 A * | 6/1965 | Dougherty ................... | 43/137 |
| 4,905,408 A * | 3/1990 | Wu .............................. | 43/137 |
| 5,058,314 A | 10/1991 | Frascone | |
| 5,634,293 A | 6/1997 | Mike et al. | |
| 6,067,746 A | 5/2000 | Kistner et al. | |
| 6,185,862 B1 | 2/2001 | Nelson | |
| 6,824,850 B1 * | 11/2004 | Nourigat .................... | 428/41.8 |

* cited by examiner

*Primary Examiner*—Peter M. Poon
*Assistant Examiner*—John Holman

(57) ABSTRACT

An insect captivating device comprising in combination, two flaps, and a first frame pivotally supporting the flaps, a sticky surface associated with one or both flaps, and a second frame operatively connected to the flaps to displace them for pivoting toward one another to close upon an insect as the second frame is displaced relative to the first frame, for captivating an insect stuck on said surface.

10 Claims, 4 Drawing Sheets

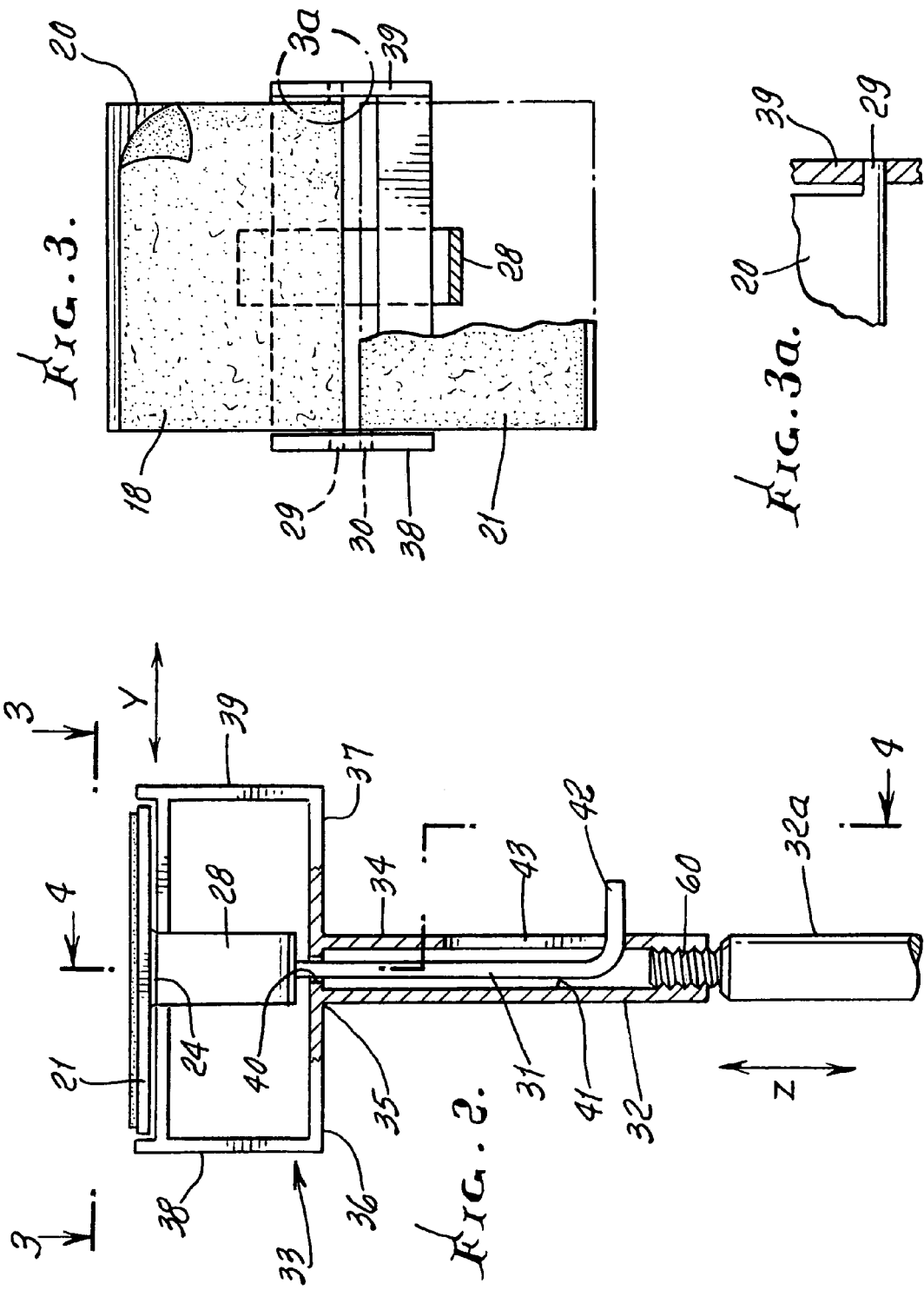

INSECT CAPTIVATION

BACKGROUND OF THE INVENTION

This invention relates generally to catching of insects on walls or ceiling surfaces, and more particularly to improvements in mechanisms and adhesive carriers for efficiently catching and disposing of such insects.

Prior devices, as shown for example in U.S. Pat. Nos. 1,190,165; 1,515,296; 1,888,563; 2,191,126; 5,058,314; 5,634,293; 6,067,746; and 6,185,862 lack the improvements in structure, operation and results, as are provided by the present invention. Accordingly, there is need for an improved device incorporating such improvements.

SUMMARY OF THE INVENTION

Basically, the insect captivating device of the invention comprises:

a) two flaps, and a first frame pivotally supporting the flaps, b) a sticky surface associated with one or both flaps, c) and a second frame operatively connected with the flaps to displace them for relative pivoting toward one another to close upon an insect as the second frame is displaced relative to the first frame, for captivating an insect stuck on the sheet.

As will appear, the second frame may be pivotally connected to the flaps at undersides thereof; also, the two flaps may be pivotally supported by the first frame whereby the two flaps close together as they pivot.

A further object includes provision of an elongated handle supporting the second frame, and a joint associated with the handle to enable tilting of the frames for flap direct presentation to upright walls; and an actuator projecting for manual displacement effecting said pivoting, as for example near the distal end of the handle.

A further feature and object of the invention is the provision of an insert sheet associated with one or both flaps and that has opposite sides, one of which defines a sticky surface. The other side of the sheet may be removably and adhesively attached to one or both flaps, to enable folding of the sheet as the flaps relatively pivot, and while the sheet remains removably attached to the flaps.

Additionally, there may be at least one local adhesive zone on the opposite side of the sheet; for example local adhesive zones may be provided on said other side of the sheet, and which are adhesively attached to both flaps; and those zones may define two elongated bands, each band adhesively attached to one or both flaps. Such structure facilitates attachment of the insert sheet to the flaps, with restriction as during folding, to captivate an insect between insert sticky surfaces.

These and other objects and advantages of the invention, as well as the details of an illustrative embodiment, will be more fully understood from the following specification and drawings, in which:

DRAWING DESCRIPTION

FIG. 1*a* is a perspective view showing two flaps with sticky insert or flap surfaces;

FIG. 1*b* shows such flaps with close presentation to the locus of an insect on a ceiling or wall;

FIG. 1*c* shows flap pivoting or folding to captivate the insect;

FIG. 1*d* shows flap positioning to closely captivate the insect;

FIG. 2 is an elevation showing apparatus for pivoting the flaps;

FIG. 3 is a plan view taken on lines 3—3 of FIG. 2;

Figure 5:
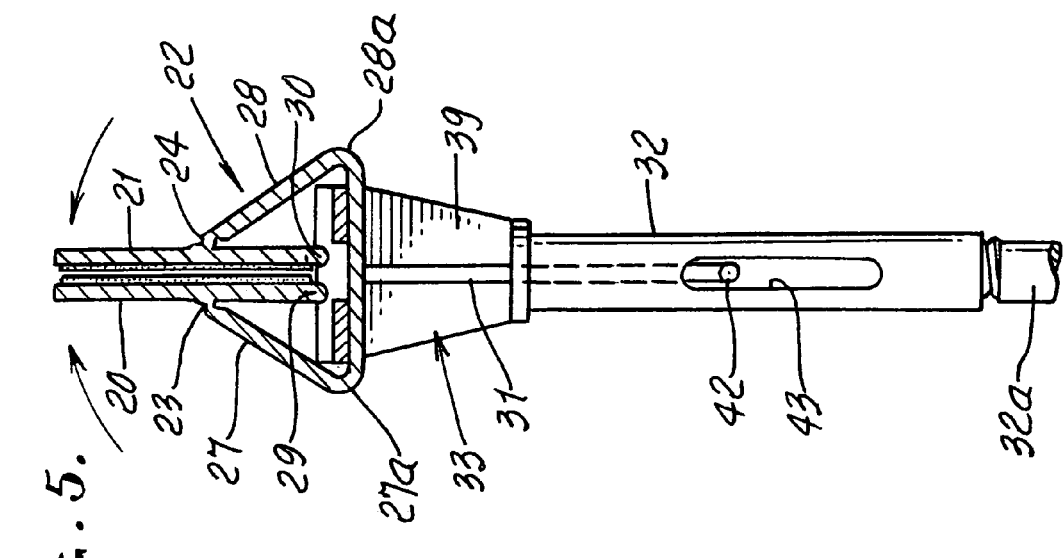
Figure 4:
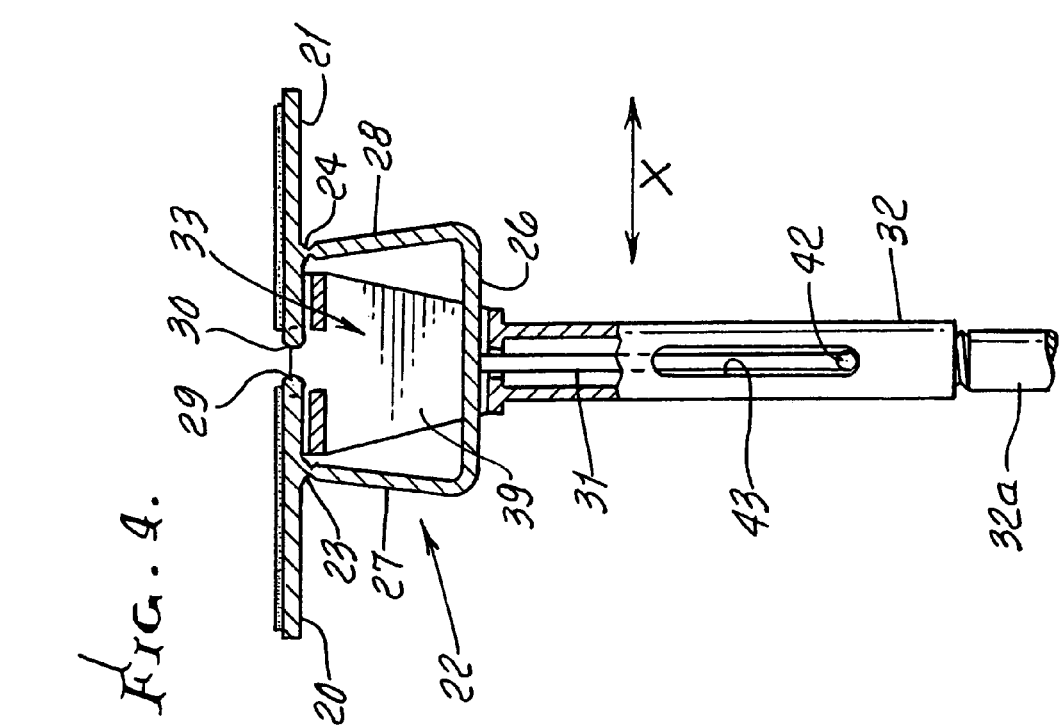

FIG. 3*a* is a fragmentary view taken on lines 3*a*—3*a* of FIG. 3;

FIG. 4 is an elevation taken on lines 4—4 of FIG. 2;

FIG. 5 is a view like FIG. 4, but showing actuation of the apparatus; and

Figure 6:
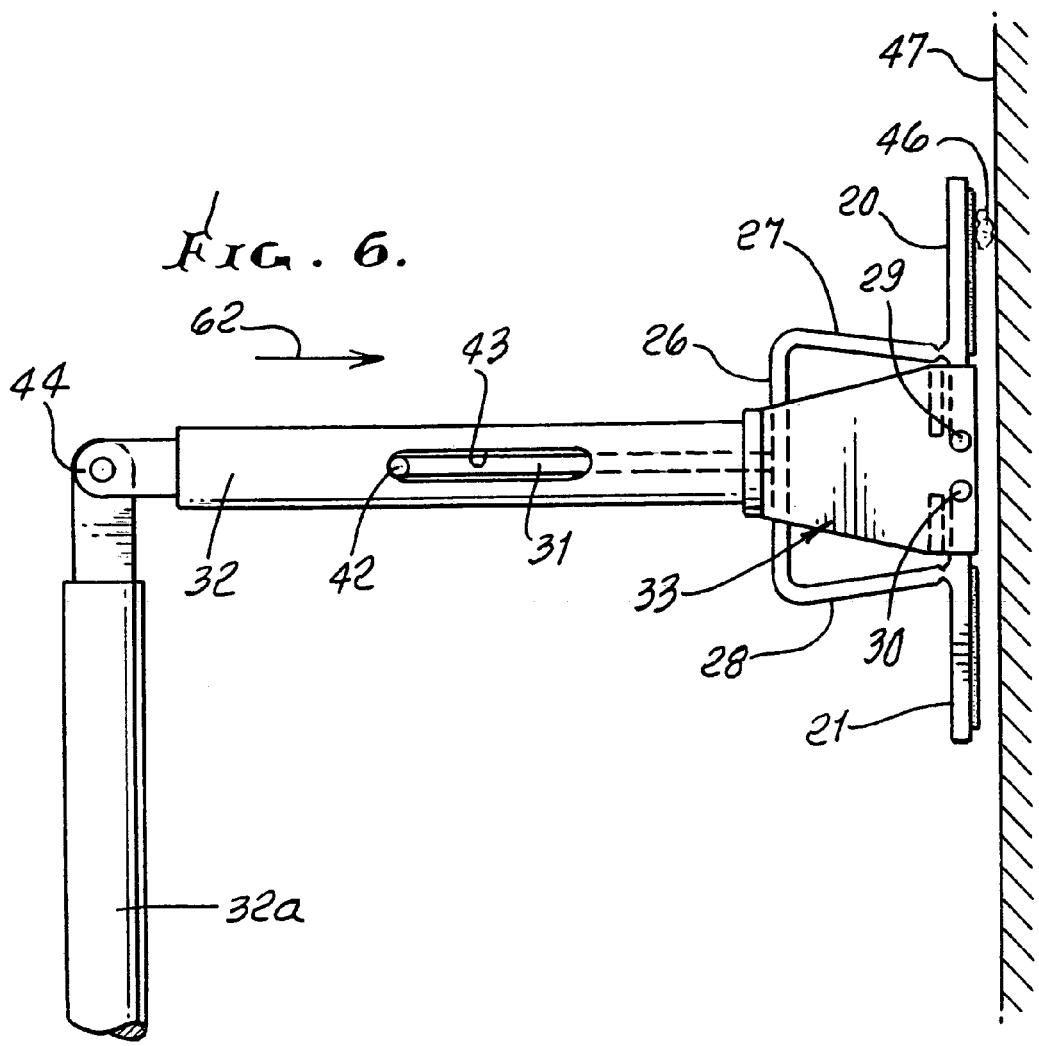
Figure 7:
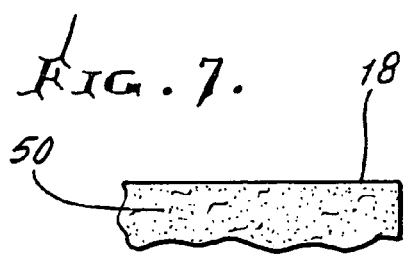

FIG. 6 is an elevation showing a joint on an elongated handle, that facilitates device tilting for captivating an insect on a vertical wall;

FIG. 7 shows one side of an insert sheet, and having a sticky surface; and

Figure 8:
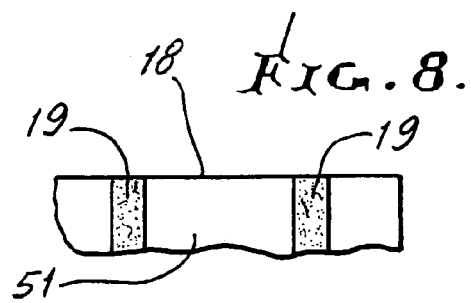

FIG. 8 shows the opposite side of the insert sheet, with adhesive zones to removably attach to a flap or flaps.

DETAILED DESCRIPTION

Figure 1A:
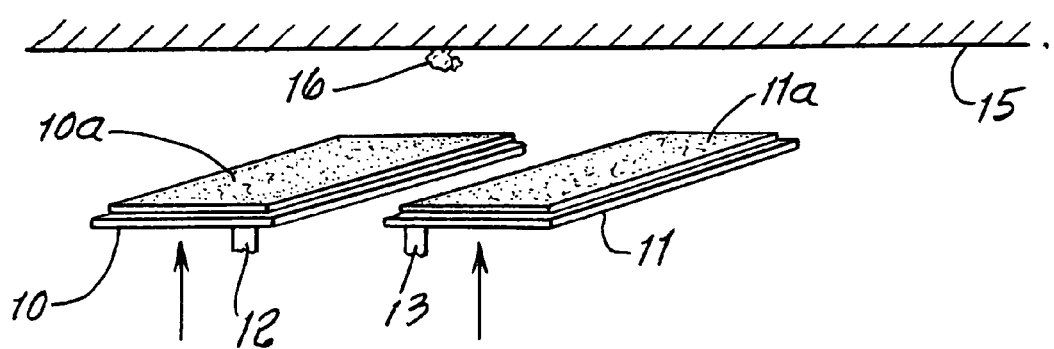
Figure 1B:
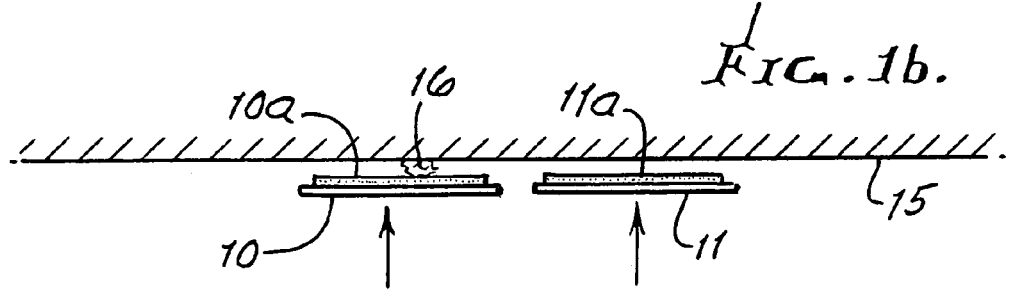
Figure 1C:
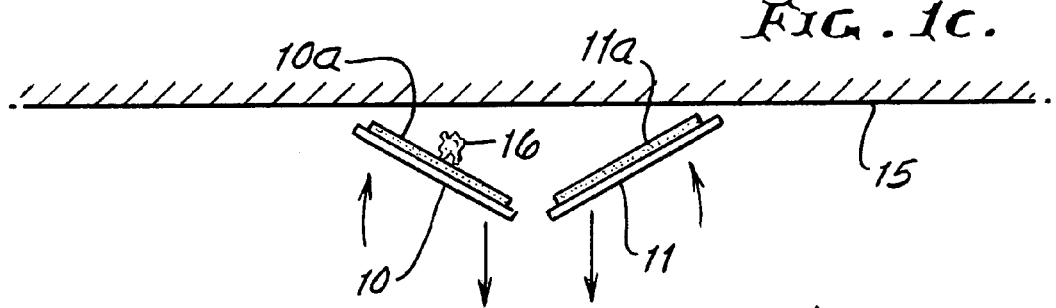
Figure 1D:
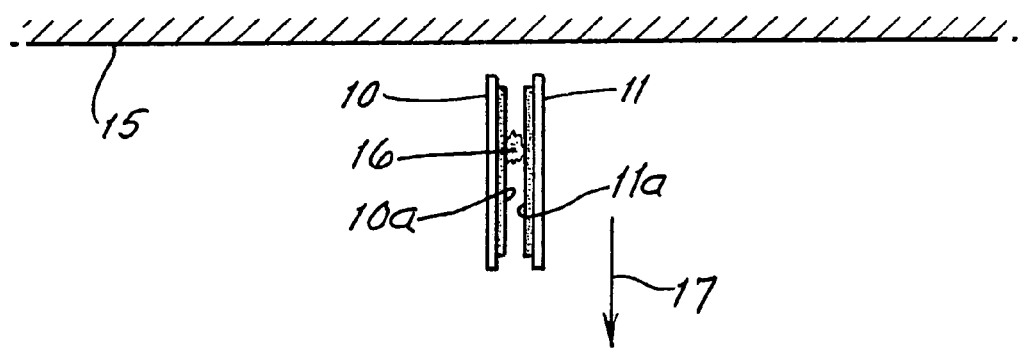

The basic mode of operation is shown in FIGS. 1*a*–1*d*. Two flaps 10 and 11 are carried at 12 and 13 to extend in parallel relation in FIGS. 1*a* and 1*b* to be lifted toward the ceiling of a room on which an insect is crawling. Each flap has a top sticky surface 10*a* and 11*a*, as on memo pad paper. FIG. 1*b* shows the two flaps lightly pressed against or toward the ceiling 15 and the insect 16, which sticks to one flap. In view 1*c*, the flaps are being lowered, and also relatively pivoted, to close the insect between them. In FIG. 1*d*, the two flaps have closed together, captivating the insect, and also are being lowered as indicated by arrow 17, so that the mechanism then retrieves the closed flaps for insect disposition. Insert paper 18, applied to the flaps, may be used, and taken off the flaps, as in FIGS. 7 and 8. FIG. 8 shows a sticky band 19, or bands, on the paper reverse side to adhere to a flap or flaps, and enabling ease of removal.

In the preferred embodiment seen in FIGS. 2–5, two flaps, in the form of plates 20 and 21, correspond to flaps 10 and 11. A first frame 22 pivotally supports those plates, for pivoting, as at locations 23 and 24. That frame is shown to include a U-shaped member 25 having a base 26, and two upright flanges 27 and 28. The pivot locations are spaced from secondary pivot location 29 and 30 proximate edges of the plate, all pivot axes being parallel. As the frame 22 is displaced upwardly as via rod 31 and handle 32, the plates pivot at 29 and 30, and relatively toward one another, as in FIG. 5. As the plates approach one another, flanges 27 and 28 may flex, as shown at 27*a* and 28*a*.

The secondary pivots, at 29 and 30 are associated with a second frame 33. The latter is shown to include an upright 34 connected at 35 to a rectangular framework that includes horizontal members 36 and 37, and upright members or flanges 38 and 39, connected to 36 and 37 as shown. Members 38 and 39 carry the secondary pivot locations 29 and 30. Note in FIG. 2, that rod 31 passes through an opening 40 and downwardly within a bore 41 in the handle 32. Handle pusher or actuator 42 projects sidewardly through an elongated slot 43 in the side wall of 32. See also handle extension 32*a*, attached at 60 to 32.

FIG. 6 is like FIGS. 1–5, but extension 32*a* is hinged at 44, to allow the extension to be pushed sidewardly (see arrow 62), to captivate an insect 46 on vertical wall 47, as in a room.

In FIGS. 7 and 8 the insert sheet 18 removably covered by and applicable to a plate, has a sticky side 50 to be pressed against an insect, and an opposite side 51. Localized sticky bands 19 on 51 allow the sheet 49 to be easily adhered to or on a plate, and removed, for insect disposal.

It will be noted that the flanges 27 and 28 are spaced apart in an X-direction; and that the two flanges or members 38 and 39 are spaced apart in Y-direction, as indicated by X and Y arrows. The handle is movable in Z direction, to close the plates toward one another. The direction X, Y and Z define a rectangular co-ordinate system, as indicated.

I claim:

1. An insect captivating device comprising in combination,
 a) two flaps, and a first frame pivotally supporting the flaps,
 b) a sticky surface associated with one or both flaps,
 c) and a second frame operatively connected to the flaps to displace them for pivoting toward one another to close upon an insect as the second frame is displaced relative to the first frame, for captivating an insect stuck on said surface,
 d) the first frame including two edge flexing flanges that are pivotally connected to the flaps at and along underside thereof, wherein the first frame includes a base integral with the two flexing flanges to define a U-shaped member wherein the flanges are convergent in directions away from said base.

2. The combination of claim 1 wherein the two flaps are pivotally supported by the first frame at locations such that the two flaps close together as they pivot.

3. The combination of claim 1 including an elongated handle supporting the second frame, there being a joint associated with the handle to enable tilting of the frame for flap direct presentation to upright walls.

4. The combination of claim 3 including an actuator projecting for manual displacement effecting said pivoting, said actuator projecting near the distal end of the handle.

5. The combination of claim 1 including an actuator projecting for manual displacement effecting said pivoting.

6. The combination of claim 1 wherein said surface is defined by an insert sheet that has opposite sides, one of which defines said sticky surface.

7. The combination of claim 6 wherein the other side of said sheet is removably and adhesively attached to one or both flaps, to enable folding of the sheet as the flaps relatively pivot and while the sheet remains removably attached to the flaps.

8. The combination of claim 7 including at least one local adhesive zone on said other side of the sheet.

9. The combination of claim 7 including local adhesive zones on said other side of the sheet, and which are adhesively attached to both flaps.

10. The combination of claim 9 wherein said local adhesive zones define two elongated bands.

* * * * *